May 11, 1965

W. E. COY 3,182,784

HINGED DOUBLE FLIGHT CONVEYER

Filed March 18, 1963

INVENTOR.
WALTER E. COY
BY
ATTORNEY

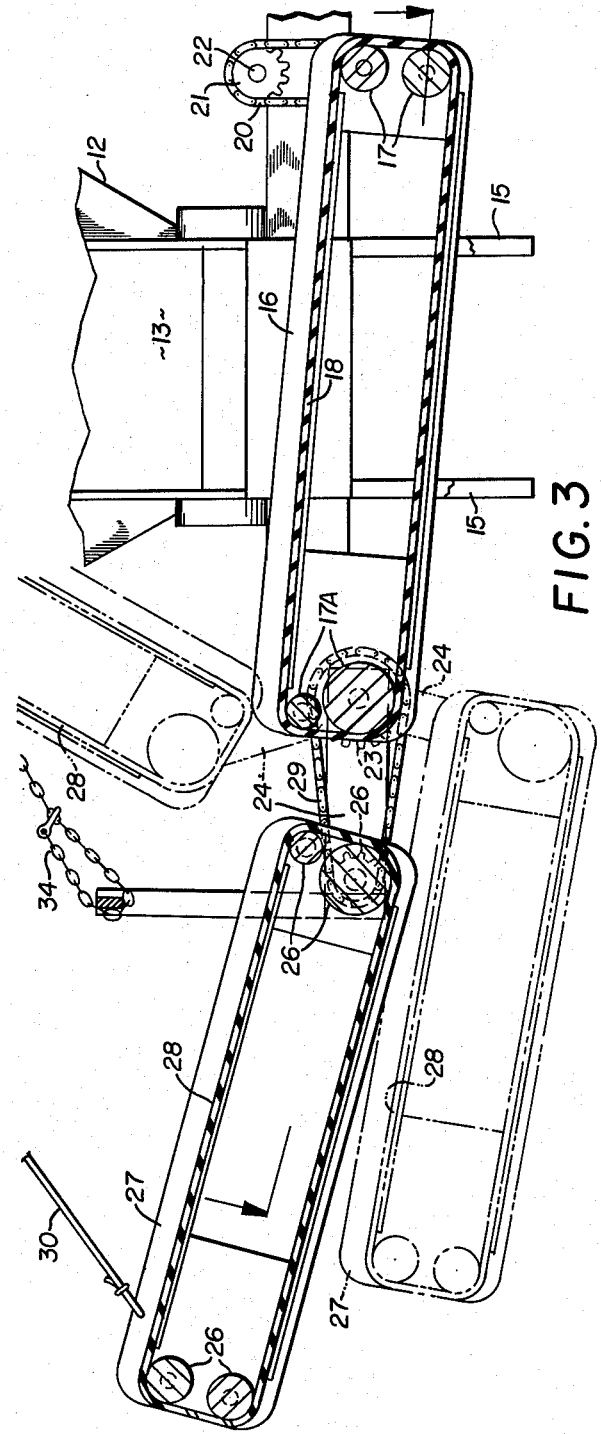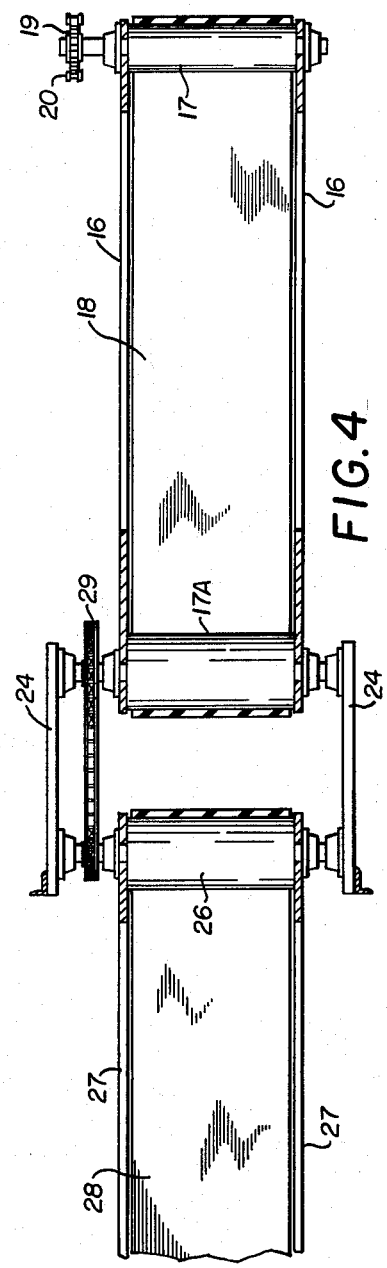

United States Patent Office 3,182,784
Patented May 11, 1965

3,182,784
HINGED DOUBLE FLIGHT CONVEYER
Walter E. Coy, Box 416, Canfield-Columbiana Road,
Canfield, Ohio
Filed Mar. 18, 1963, Ser. No. 265,702
4 Claims. (Cl. 198—99)

The invention relates to a conveyer and more particularly to a double flight belt-type conveyer in which one of the flights is hingedly mounted relative to the other for directional delivery of material conveyed thereby.

The principal object of the invention is the provision of a hinged belt-type conveyer structure incorporating means for adjustably positioning one portion of said conveyer relative to another portion.

A further object of the invention is the provision of a belt-type conveyer incorporating a pair of conveyer belts positioned in end to end arrangement with one end of one of said belts adjustably mounted relative to one end of the other of said belts.

A further object of the invention is the provision of means for continuously conveying dry powdered or granular materials and the like and controlling the angle of delivery of said materials and hence the disposition thereof.

The conveyer disclosed herein comprises an improvement in the art of belt conveyers and particularly as applied to motor truck bodies for delivering powdered or granular materials and the like from a delivery orifice in the motor truck body to a remote location.

The particular novelty in the present invention is its ability to deliver material sidewardly from the truck body a considerable distance and at any desired angle relative thereto so that the material may be positioned at an elevated location relative to the truck body or at a considerable distance sidewardly therefrom as desired.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 3 is a side elevation with parts in cross section and parts broken away taken on line 3—3 of FIGURE 1 with broken lines indicating alternate positions of a portion thereof.

FIGURE 4 is a top plan view on line 4—4 of FIGURE 3.

Figure 1:
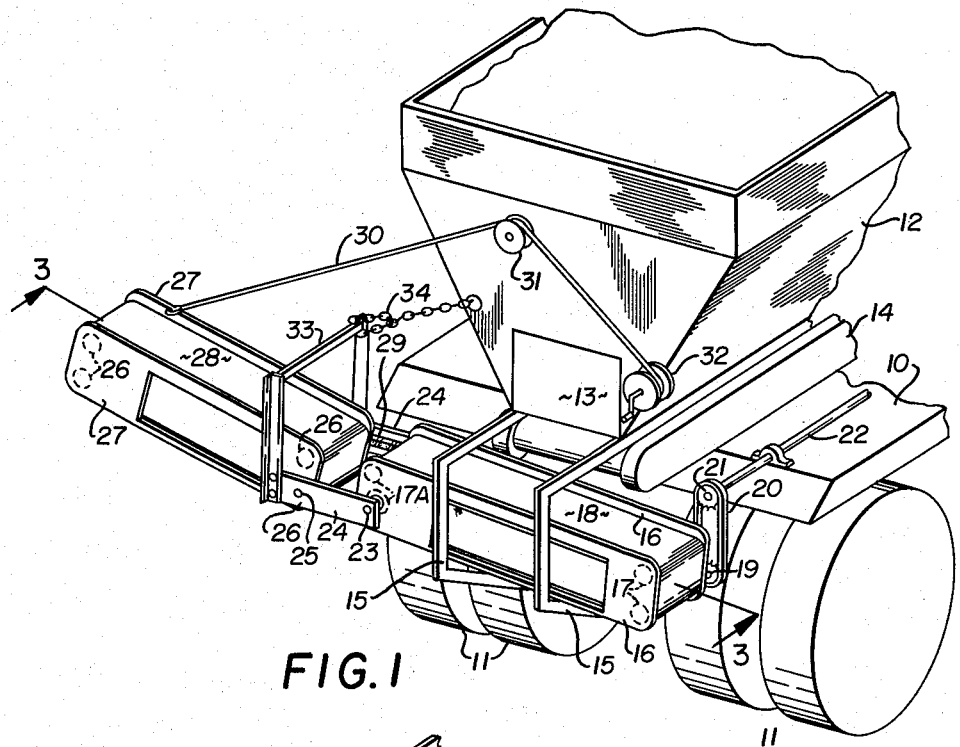
FIGURE 1 is a perspective view of a portion of a motor truck body showing one form of the conveyer in operative relation thereto.

By referring to the drawings and FIGURE 1 in particular, it will be seen that a motor vehicle such as a truck having a main frame 10 and dual ground engaging wheels 11, 11 is provided with a hopper body 12 having an outlet orifice 13 adjacent its rearmost portion. Such truck bodies are known in the art and generally include a conveyer 14 longitudinally of the hopper body so that material therein can be moved to the point of discharge comprising the delivery orifice 13. Frame extensions 15, 15 support a first conveyer unit comprising a pair of horizontally spaced similarly formed side frames 16, 16 having a plurality of rolls 17, 17 journalled therebetween over which a conveyer belt 18 is trained. One of the rolls 17 has a shaft extension terminating in a sprocket 19 which is adapted to be driven by a chain 20 trained over a sprocket 21 on the end of a drive shaft 22 which extends to a source of driving motion on the truck (not shown) and which source is also employed for driving the conveyer 14 heretofore referred to. It will thus be seen that material in the hopper body 12 moved by the conveyer 14 to the discharge orifice 13 will fall upon the conveyer belt 18 and be moved thereby. In the present disclosure, the arrangement is such that the upper surface of the belt 18 moves from right to left as seen in FIGURE 1 and at relatively high speed. The ends of the side frame members 16, 16 opposite to the ends carrying the drive sprocket 19 are provided with similar rolls 17A one of which has a shaft extension with a sprocket 23 thereon. A pair of extension members 24, 24 are pivotally secured to the side frames 16, 16 and extend longitudinally thereof beyond the left ends thereof as seen in FIGURE 1 where they are provided with opposed bearings journalling the ends of a shaft 25 on which one of a plurality of rollers 26, 26 is positioned. A pair of secondary side frame members 27, 27 are spaced by the additional rollers 26, 26, the ends of which are journalled therein and a secondary conveyer belt 28 is trained thereover. The first-mentioned roller 26 is provided with a shaft extension having a sprocket thereon and a chain 20 extends over the sprocket on the roll 26 and over the sprocket 23 on one of the rollers 17A.

The sprockets 26 and 23 are of different sizes so that the secondary conveyer belt runs at approximately double the speed of the first-mentioned conveyer belt 18.

The secondary conveyer unit formed by the side frames 27, 27 and belt 28 is pivotally mounted on the shaft 25 so that it may be moved in an arc based thereon and means for so moving it is provided and comprises a cable 30 directed over an idler 31 on the hopper body to a winch 32 also located thereon. An inverted U-shaped subframe is attached to the outer ends of the extension members 24, 24 and stands substantially vertically thereabove spanning the secondary conveyer unit and its secondary belt 28. A chain or cable 34 preferably secures the same to the hopper body 12 in pre-determined desirable relation which it will be observed is adjustable as the opposite ends of the extension members 24, 24 are pivoted to the side members 16, 16 of the first conveyer unit.

By referring now to FIGURE 3 of the drawings, an alternate positioning of the secondary conveyer unit including the belt 28 may be seen as illustrated in broken lines and it will be observed that by altering the position of the location of the secondary conveyer unit comprising secondary side frames 27, 27 and the belt 28, the said unit may be moved either into storage position as shown in broken lines in the upper portion of FIGURE 3 or into any one of a number of alternate positions such as the one shown in broken lines in the lower portion of FIGURE 3.

It will thus be seen that the angle of inclination of the secondary conveyer belt 28 may be varied so that the material thrown thereon by the primary conveyer belt 10 will be delivered to a desired destination point.

In FIGURES 3 and 4 of the drawings the means for driving the belts 18 and 28 is clearly illustrated and the sprockets 23 and 26 and the chain 29 interconnecting the same are shown, and it will be observed that the relative positioning of these sprockets remains the same due to the fact that they are journalled on the shaft extensions of their associated rollers 17A and 26.

Figure 2:
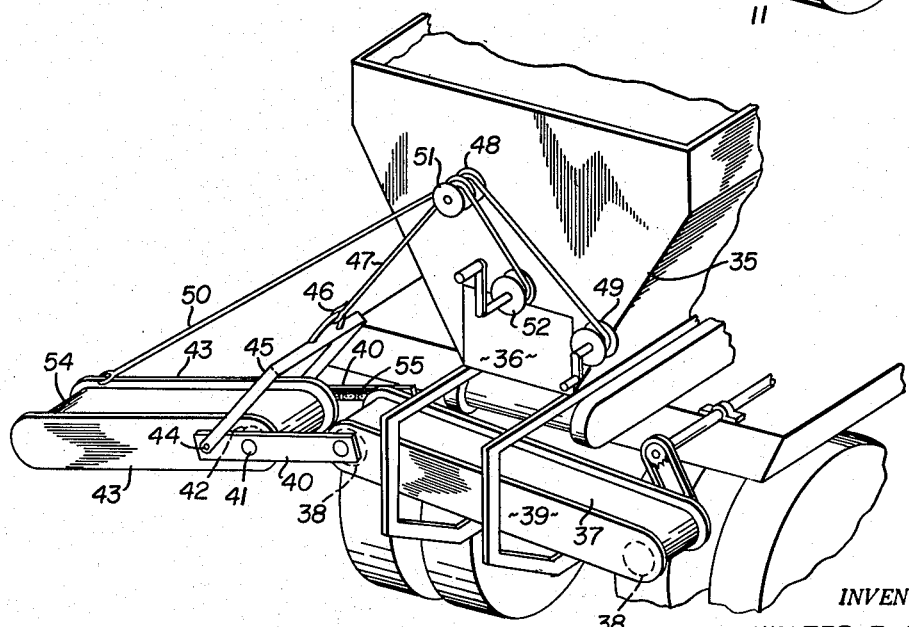
FIGURE 2 is a perspective view of a modified form of a conveyer.

It will occur to those skilled in the art that a simple form of double flight conveyer may be utilized and by referring to FIGURE 2 of the drawings such a modification may be seen. In FIGURE 2 a hopper body 35 having a discharge opening 36 adjacent a first conveyer belt 37 may be seen that it will be observed that the belt 37 is trained over a pair of rolls 38 one of which is driven by a power take-off mechanism of the vehicle supporting the hopper body 35 as in connection with the form of the invention illustrated in FIGURE 1 and heretofore described. Rollers 38, 38 one of which is driven are positioned between and supported by spaced elongated side frame members 39, 39 and a pair of pivoted extension members 40, 40 are pivoted to the shafts comprising the end extensions of one of the rollers 38 and extend outwardly from the side frame members 39, 39 and have spaced openings therein which form journals for a shaft 41 which in turn mounts a roller 42 which is one of a pair of such rollers positioned between a pair of secondary side frame members 43, 43. The outermost ends of the extensions 40, 40 (which are considerably elongated as compared with the comparable members 27, 27 as illustrated in FIGURE 1) have pivots 44, 44 securing and mounting the ends of an inverted U-shaped frame, the uppermost portion of which has a loop 46 thereon to which a cable 47 is attached. It will thus be observed that the extension members provide three longitudinally spaced pairs of pivot means, the middle ones of which are the ones on the righthand end of which serve to mount the conveyer rolls 38 and 42 respectively while the means in opposite end carries the pivots 44 by which the frame 45 is pivotally secured to the assembly. The cable 47 is trained over an idler 48 on the hopper 35 and leads to winch 49. A secondary cable 50 is secured to one of the frame members 43, and leads over a second idler 51 to a second winch 52 on the hopper body 35. It will be obvious to those skilled in the art that the winches 49 and 52 may be combined utilizing sheaves of different diameters so that a common rotating motion will impart a desirable motion to the cables 49 and 50 and hence be capable of moving the secondary conveyer unit including the secondary conveyer belt 54 in a desired manner with respect to the first conveyer belt 37.

It will be obvious that the secondary conveyer belt 54 may thus be moved to many and various positions and it will be understood that a drive chain 55 interconnects sprockets on the shaft extensions of the rolls 38 and 42 so that the driving motion initially imparted the first belt 37 will be sped up by the interconnecting chain 55 so as to drive the secondary belt 54 at a more rapid rate relative to the belt 37.

It will thus be seen that a double flight adjustable conveyer particularly suitable for use on a truck having a hopper body has been disclosed and that two forms of the conveyer belt carrying means have been illustrated and described. In the form illustrated in FIGURE 2, the somewhat different arrangement of the pivotal mounting of the secondary belt relative to the first by means of the modified and elongated extension members 40, 40 operates to provide a flexibility superior to the form of the invention illustrated in FIGURES 1, 3 and 4 of the drawings.

It will be seen that the invention will operate to deliver powdered or granular materials or the like to various locations beside the vehicle on which it is mounted and at various elevations relative thereto, and it will be understood that the material on the first of the belts 18, or 37, as the case may be, is thrown across the gap between the same and the secondary belts 28 and 54 respectively, due to the speed of operation with no loss of material regardless of the angle at which the secondary belts may be positioned.

It will thus be seen that a dual flight conveyer system incorporating an adjustable second section or flight has been disclosed which meets the several objects of the invention, and having thus described my invention, what I claim is:

1. A dual flight conveyer system for handling powdered and granular materials and the like and comprising a first conveyer unit including spaced side frames, rollers positioned therebetween at the opposite ends thereof and a first conveyer belt trained thereover and a second conveyer unit comprising spaced side frames, rollers positioned therebetween at the opposite ends thereof and a second conveyer belt trained thereover and extension members pivotally secured to the adjacent ends of said conveyer units and mounting the same in movable spaced relation to one another and means for supporting said conveyer units and means for moving said secondary conveyer unit relative to said first conveyer unit, means for driving said first conveyer belt of said first conveyer unit and drive means interconnecting said first and second conveyer units for imparting said drive to said second conveyer belt on said second conveyer unit.

2. The conveyer system set forth in claim 1 and wherein the side frames of the first and second conveyer units comprise horizontally spaced elongated members having journals on their inner opposed faces and wherein said rollers supporting said conveyer belts are positioned in said journals and wherein said extension members are mounted on the ends of said rollers.

3. The conveyer system set forth in claim 1 and wherein said side frames of said first and second conveyer units have oppositely disposed journals on their oppositely disposed surfaces and wherein said rollers support said conveyer belts and are positioned in said journals and wherein sprockets are affixed to some of said rollers and chains are positioned over said sprockets and form said drive means and wherein said extension members are mounted on the ends of said rollers.

4. The conveyer system set forth in claim 1 and wherein said extension members comprise elongated frames each of which is secured at one of its ends to pivots on said side frames of said first conveyer unit and each of which is secured by pivots intermediate its ends to said side frames of said secondary conveyer unit, said pivots being on the axis of said rollers and wherein said means for moving said secondary conveyer unit comprises a member engaged upon the opposite ends of said extension members in spaced relation to said pivots and in spanning relation to said conveyer units.

References Cited by the Examiner
UNITED STATES PATENTS

| 287,882 | 11/83 | Springer | 198—88 |
| 311,209 | 1/85 | Sprague et al. | 198—90 X |
| 797,116 | 8/05 | Holland et al. | 198—122 X |
| 1,106,632 | 8/14 | De Moure | 198—121 X |
| 1,726,555 | 9/29 | Gammeter | 198—203 |
| 2,293,486 | 8/42 | Barrett | 198—88 X |
| 2,303,684 | 12/42 | Cook | 198—88 X |
| 2,422,268 | 6/47 | Symonds | 198—97 X |

ROBERT B. REEVES, Acting Primary Examiner.

WILLIAM B. LA BORDE, Examiner.